June 4, 1957   H. T. KRAFT   2,794,503
TIRE SIPING MACHINE
Filed April 24, 1953   3 Sheets-Sheet 1

INVENTOR
Herman T. Kraft
BY Evans & McCoy
ATTORNEYS

June 4, 1957  H. T. KRAFT  2,794,503
TIRE SIPING MACHINE

Filed April 24, 1953  3 Sheets-Sheet 2

INVENTOR
*Herman T. Kraft*
BY *Evans & McCoy*
ATTORNEYS

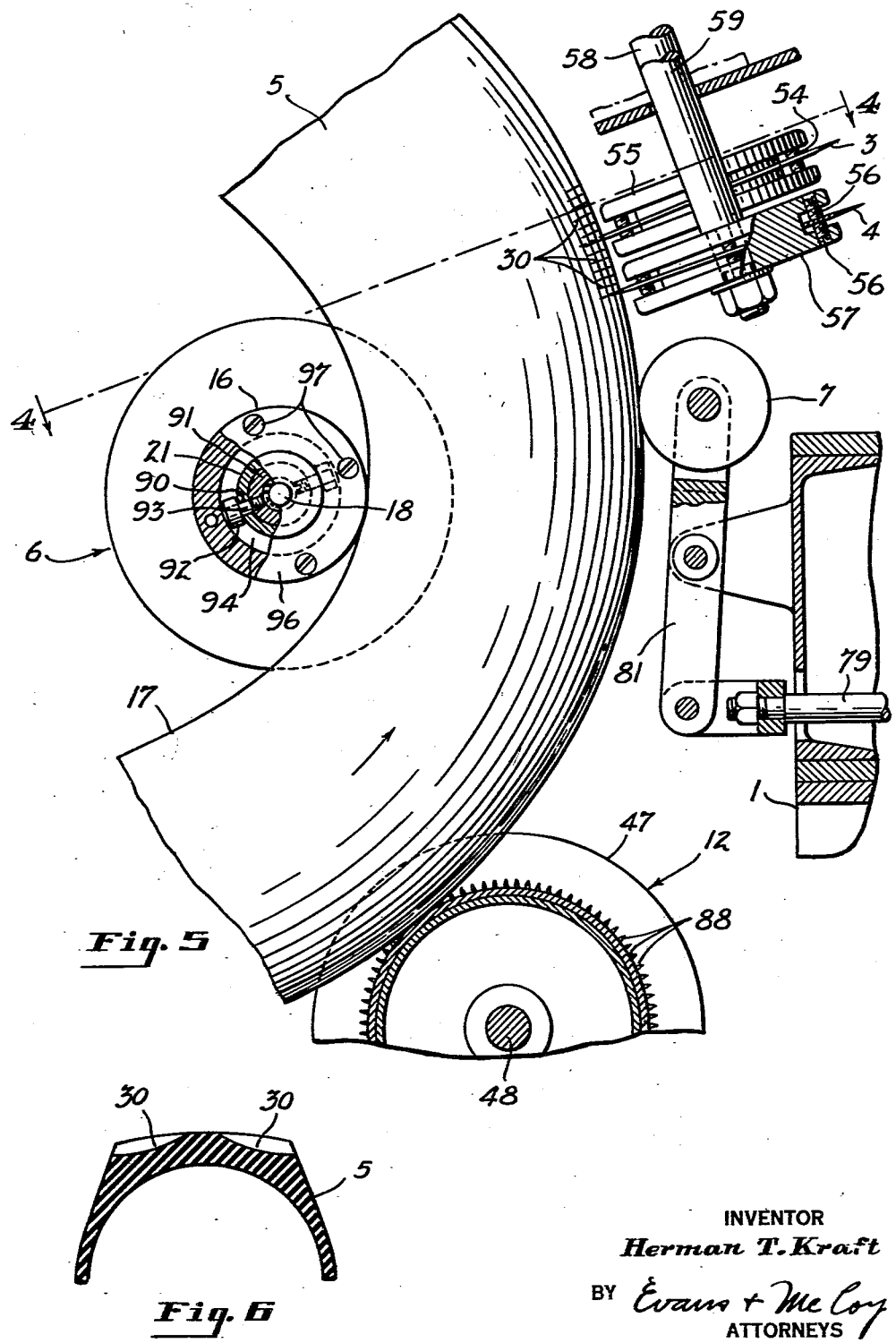

United States Patent Office 2,794,503
Patented June 4, 1957

2,794,503

TIRE SIPING MACHINE

Herman T. Kraft, Akron, Ohio, assignor to The General Tire and Rubber Company, Akron, Ohio, a corporation of Ohio Application April 24, 1953, Serial No. 350,985

6 Claims. (Cl. 164—10.2)

This invention relates to a method and apparatus for forming fine slits or cuts in the tread portions of pneumatic tires. The process of providing a tire tread with a multiplicity of fine slits is known in the arts as siping.

For some time it has been known that a multiplicity of fine slits in a tire tread greatly increases the road gripping and skid-resistant characteristics of the tire.

One object of the present invention is to provide a simple, efficient, and inexpensive machine for siping tires.

Another object is to provide an apparatus for siping tires in which a series of variably shaped sipes are formed in the shoulder portions of the tires.

Another object of this invention is to provide a tire siping machine with a feeding mechanism which automatically varies the spacing between cuts so as to minimize road noise and hum.

Other objects and advantages will appear in the following detailed description of the subject invention and in the accompanying drawings, in which like numerals relate to like parts.

Fig. 5 is an enlarged side elevation partially in cross section showing a tire being cut and fed past the cutting blades by the spiked, tire-driving drum; and Fig. 6 is a cross-sectional view of a tire siped by the apparatus of the present invention.

This invention relates to a tire siping apparatus in which the tires are cut in the shoulder portions by a pair of circular cutting blades. The cutting blades rotate about fixed axes substantially parallel to the plane of the tire beads and transverse the axis of the tire but are not otherwise moved across the tread face. The blades are mounted at right angles to the axes so that they are also at right angles to the planes of the tire beads and rotate in a plane substantially perpendicular to the plane of the tire beads and are directed toward the center of the tire. Each blade has an edge portion cut out for a part of the blade circumference to provide for clearance and advancement of the tire. The cut-out edge portions are correlated so that they are presented to the corners of the tire tread simultaneously and the tire is free to advance.

The tire is mounted on a center positioning disc and is driven by a tire rotating means comprising a spiked driving drum. Top and bottom spools also align and position the tire. The cutting blades act as escapement and the driving drum forces the tire tread past the cutting blades between cutting operations. There is no particular indexing or spacing apparatus for spacing the cuts about the circumference of the tire. This arrangement, however, gives a varied spacing between the cuts to minimize hum and road noise. As used herein, the tire axis is the central axis of a tire as mounted on a wheel and corresponds to the axle of a vehicle.

Figure 1:
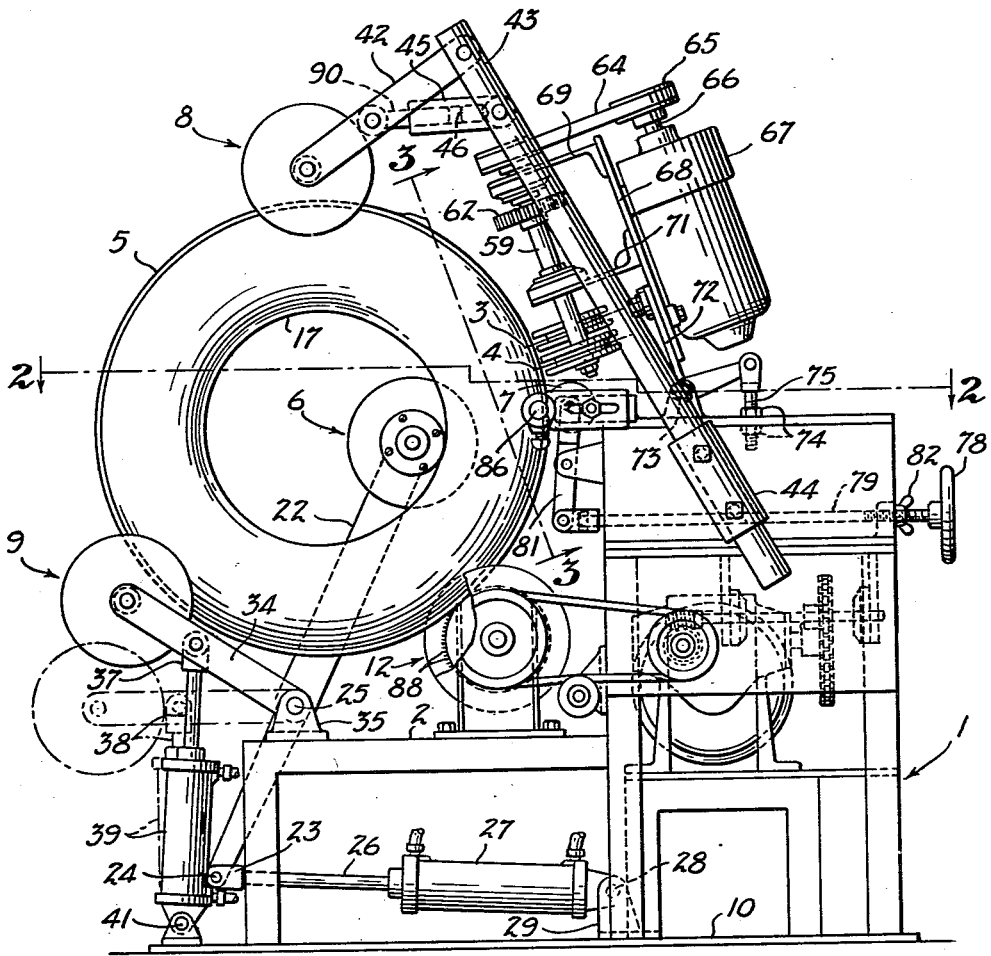
Figure 1 is a side elevation of the siping machine of the present invention with a tire mounted thereon.

A side elevation view of my siping machine is shown in Fig. 1. Here a rectangularly shaped, relatively high frame 1 provided with a lower shelf or table 2 supports the apparatus. The frame and lower shelf are mounted on base 10. A cutting or siping means comprising two opposed cutting blades 3 and 4 and the necessary driving mechanism is pivotally mounted on top of the frame and can be adjusted so as to cut into the tire tread as desired. The tire to be siped 5 is supported on a central positioning means 6 so that the beads of the tire rest on the positioning means. The positioning means is then advanced so as to hold the tire tread firmly against the cutting blades. At the same time, a roller 7 mounted on the frame immediately below the cutting blades prevents the tire tread from rubbing against the frame.

A top guide means 8 runs on the upper tread portion of the tire and prevents the tire from lifting, sidesway, or otherwise coming out of position. A bottom guide means 9 also pushes against the tire tread and aids in bracing the tire against the roller means. Side guide rolls 11 mounted on the frame in the vicinity of the cutting means limits sidewise motion of the tire. The tire is driven past the cutting blades by a spiked driving drum 12 mounted on table 2 below the tire.

Figures 3, 4:
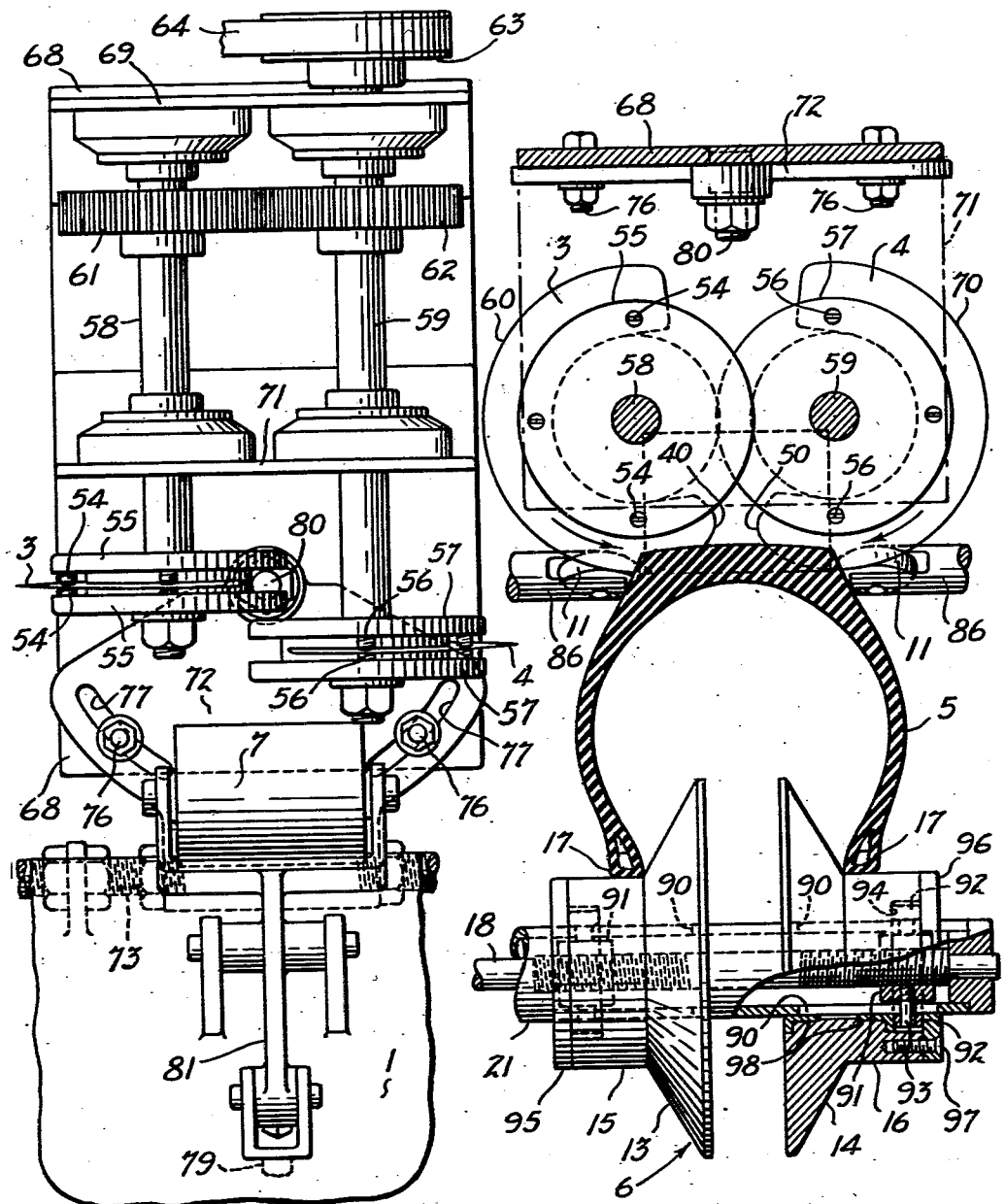
Fig. 3 is a view taken along line 3—3 in Fig. 1 showing the drive and mounting for the cutting blades and the cutting blades.
Fig. 4 is a view, partially in cross section, taken along line 4—4 in Fig. 5 showing a tire held against the cutting blades and the cutting blades cutting a tire.

The central positioning means or central support means 6 comprises a pair of complementary and opposed discs 13 and 14 with cylindrical shoulders or drum portions 15 and 16 mounted on either side of the discs. The discs 13 and 14 are spaced apart so as to fit just inside the tire beads 17 and direct them onto the shoulders 15 and 16 as is shown in Fig. 4. Both the discs and drum portions are mounted on hollow shaft or sleeve 21. The discs are frusto-conical with the larger diameter being located nearest the middle or center of the machine. A worm 18 operated by handle 19 with right hand and left hand threads provides a means for adjusting flanges 13 and 14 to move them in and out to correspond with the distance apart of the tire beads. Referring to Figs. 4 and 5, internally threaded collars or nuts 91 are mounted on worm gear 18 for in and out movement along the worm gear as the gear is rotated. Rollers 92 are in turn rotatable on pins 93 screwed into collars 91 and roll against the sides of the slots 94 formed between hubs 15 and 16 and end plates 95 and 96. Screws 97 hold end plates 95 and 96 against the hubs 15 and 16. Pins 93 fit in lengthwise slots 90 in sleeve 21 and cylindrical bearing pieces or bushings 98 are mounted on each hub to decrease friction with the sleeve. In this way, hubs 15 and 16 turn freely on sleeve 21 and are moved in and out to accommodate the tire size. Other support means such as a central roller or smooth bar can also be used instead of the support shown.

The central supporting means 6 is mounted on shaft 21 which is in turn mounted on positioning arm 22 which extends diagonally downward to piston rod head 23. It is connected to this piston rod head by a connecting pin 24. Approximately one-half way on arm 22 between the support means and the piston rod head is a pivot pin 25 mounted near the edge of frame platform 2. Piston rod head 23 in turn connects to piston rod 26 which is joined to a piston in cylinder 27. Cylinder 27 is pivotally connected to the base of the frame by pin 28 through bracket 29. Hose connections provide outlet and inlet means for the air or hydraulic fluid to cylinder. In accordance with this arrangement, when piston rod head 23 is forced out from cylinder 27, arm 22 pivots on the frame and the support means 6 presses the tire against the cutting blades. The positioning arm is thus adapted for in-and-out motion to place and remove the tire tread from engagement with the cutter blades.

Figure 2:
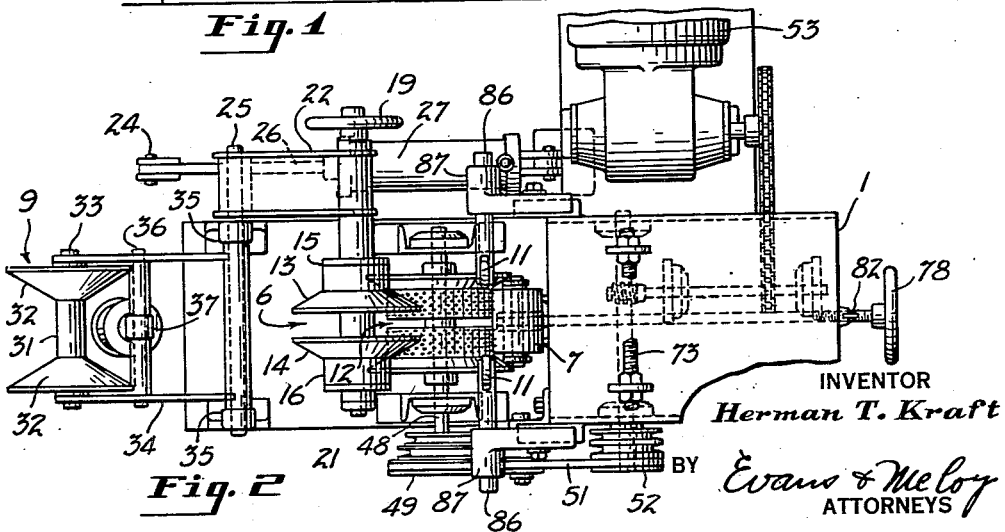
Fig. 2 is a plan view of the siping machine of Fig. 1 taken along line 2—2 of Fig. 1.

The tire is also supported and positioned by top and bottom guide means 8 and 9. Bottom guide means 9 can be any means that can press against the tire and minimize side sway with a minimum of friction. As shown in Figs. 1 and 2, it comprises a central core or spool portion 31 and two side flange portions 32. The flanges are frusto-conically shaped with the large diameter on the outside or away from the center of the machine. This guide means or spool is mounted on a pin 33 so that it may turn freely. Other low friction means capable of pressing against the tire tread is also satisfactory such as a smooth bar or roller.

A pair of bracket arms 34, which are pivoted on the table portion of the frame, support the spool 9. Supports 35 on the table provide a bearing for the pivot pin 25 connecting through the lower end of the bracket arm.

Immediately between the spool and the bracket arm pivot support on the table is a cross-brace pin 36 connected to head 37 which in turn is connected to piston rod 38. Piston rod 38 connects to a piston in air or hydraulic cylinder 39 so as to lift the spool about its pivot point and against the tire to additionally guide and support it. Cylinder 39 is mounted at the base of frame 1 substantially below the guide spool 9. This cylinder is preferably pivoted in its mounting on pin 41 as shown. Hose connections provide outlet and inlets for actuation of the cylinder.

Top spool 8 is similar in construction to bottom spool 9. It likewise may be of cylindrical or other shape which presses and engages the tire tread without excessive friction and drag. Spool 8 is mounted on arm 42 which in turn is pivotly mounted on the end of support arm 43. Arm 43 fits into mounting 44 and is bolted to the frame. A spacer is mounted between arm 42 and arm 43 to prevent the spool from bumping against the cutting means when a tire is not on the apparatus. This comprises a cylinder 45 pivoted on a support arm 43, and a rod 90 pivoted on arm 42 with a rubber disc 46 in the end of the cylinder to act as a shock absorber.

The tire is rotated by a spiked driving drum or circumference drive means 12 which is bolted to frame table 2. This drum is provided with a pair of end flanges 47 (Fig. 5) and is mounted on shaft 48. Shaft 48 extends out from the drum and pulley wheels 49 are in turn keyed to it. Belt 51 drives pulley wheels 49 and is in turn driven by pulley wheels 52. These wheels are driven from electric motor or other power means 53 through a worm gear and chain belt arrangement. The pulley wheels 49 have different diameters so that the belt can be changed and the drum can be driven fast or slow as desired.

The actual siping means comprises a pair of cutting blades or sharpened discs 3 and 4. These blades comprise a disc with a circumferential portion removed or with an interrupted peripheral cutting edge to form gaps as shown in Fig. 4. The discs are of a generally circular form adapted for rotation about a center axis The leading edges 40 and 50 of blades 3 and 4 respectively and the outer circumferences 60 and 70 of each disc are both sharpened to a knife edge. The diameter of the discs should be from one half the width of the tire tread up to three or four or more times the width of the tire tread depending upon the radius of curvature desired. A small radius gives arcuate sipes at the sides of the tire tread and a large radius gives less arcuate sipes extending toward and into the mid-point on the tread face.

The discs are geared together and correlated so that the removed portion of each disc faces the other disc and provides clearance at the tire shoulders for advancement of the tire tread while at the same time, the blade is disengaged from the tire tread.

It is necessary that the discs have removed portions in order to provide for advancement of the tire. If a solid disc were used, there would be no way of disengaging the cutter blade from the tire. The cut-out portions extend from 60 to 155 or more degrees on the disc circumference depending upon the disc diameter and preferably comprise around 130 degrees. Around at least 60 degrees should be removed to provide minimum clearance. Larger diameter blades require less clearance.

The cutting blades are mounted between top and bottom plates and are positioned with a series of top and bottom set screws so as to be clamped firmly between them. Thus the higher blade 3 is held by set screws 54 between mounting plates 55 and the lower blade is held by set screws 56 between mounting plates 57. The mounting plates are in turn bolted to shafts 58 and 59 respectively. If desired, the blades may be set to converge slightly toward one another as shown in Fig. 5 to assist in gripping the tire and feeding it forward from the spiked driving drum as the blades cut through it. The pitch or setting can be varied by adjustment of the set screws holding the cutting blades. Generally, however, the blades are set parallel to one another.

The blades are preferably mounted on their axes so as to be substantially at right angles to the planes of the tire beads, so as to cut straight across the tire tread and not at an angle to the plane of tire beads, and so as to be directed substantially toward the center of the tire tread circumference.

Shafts 58 and 59 are geared together by meshing gears 61 and 62. Shaft 59 is driven by pulley wheel 63 by belt 64 which in turn is driven by pulley 65 on motor shaft 66. The driving motor 67 is mounted on supporting plate 68. Top and bottom mounting flanges 69 and 71 at right angles to plate 68 support the blade shafts and are in turn bolted to supporting plate 68.

Supporting plate 68 is in turn bolted to L-shaped bracket 72 which pivots on pivot pin 73 in a mounting on the top portion of frame 1. The lower arm of the L-shaped bracket is vertically adjusted by adjusting nuts 74 on threaded rod 75 to in turn set and adjust the inclination of the supporting plate and cutting blades. In this way, the angle and the cuts on the tire tread can be varied by changing the angle at which the blades are held.

The blades can also be tilted from side to side by adjustment of mounting plate 68 through bolts 76 in slots 77 of the bracket as shown in Fig. 3. Bracket 72 pivots around bolt 80. In such a case, the blades are not at right angles to the planes of the tire beads.

The cutting blades preferably rotate in opposite directions so as to minimize side thrust as shown in Fig. 4. This figure also shows how the cut-out circumferential portions of the blades are paired against and correspond to one another to provide for advancement of the tire.

Roller 7, which prevents the tire from scraping against the frame, is adjustable in and out through handle 78 on the back of the frame. This handle feeds rod 79 in and out to move pivoted arm 81 so as to in turn adjust the roller. Wing nut 82 locks the rod in place.

Fig. 4 illustrates how the side positioning wheels 11 mounted in rods 86 hold the tire from sidewise motion as it is being cut. The rods 86 may be adjusted in brackets 87 in accordance with the width of the tire crown.

A cross section of the driving drum is shown in Fig. 5. The drum preferably has side flanges 47 to make sure that the tire stays on the drum. The surface of the drum is provided with a multiplicity of pins 88 which dig into the tire tread and provide a positive engagement with it. Other tread engaging means such as deep knurling or sharp ribs across the drum face may also be used. However, the pins as shown provide the preferable driving engagement. The drum is keyed to shaft 48 and driven from pulley wheel 49 as already described.

Other means for holding and rotating the tire may be used in place of the holding and rotating means shown. For instance, the beads of the tire may be gripped as shown in U. S. Patent No. 2,229,713 to Wikle and the tire rotated from the center. Likewise, the tire may be driven from the top as shown in U. S. Patent No. 2,567,149 to Errig et al. The means shown is preferable, however, because of its simplicity and convenience in mounting and demounting the tire.

The operation of this machine is as follows: A tire is placed on the central positioning means. Air or hydraulic fluid is then led into cylinder 27 to force the positioning means against the cutting blades. Air or hydraulic fluid is also led into cylinder 39 to force bottom roller against the tire tread and also position the tire against the blades. The top roller is more of a guide and does not exert appreciable pressure downward on the tire. If desired, a spring may be provided between arms or the frame to pull this roller down against the tire. The driving drum and cutting blades are started simultaneously.

In operation the cutting blades act as an escapement so that the tire is always in some compression between the driving drum and the cutting blades and there is upward force on the cutting blades from the tire. In this way, whenever the cut away portions of the pair of cutting blades are facing the tire so that the cutting blades are not in actual engagement with the tire, the tire rapidly feeds itself forward until it is again engaged and held by the leading edge of the cutting blade. Because of minor discrepancies in this operation, a variable spacing between successive sipes is achieved. This minimizes hum and noise in the tire and eliminates any necessity for an indexing attachment on the said drum or cutting blades.

When the outer tread has been completely siped, the machine is stopped and the tire disengaged. If desired, a metal flag or pin may be placed in the tire at the initial sipe so as to trip a switch and automatically stop the machine as the initial sipe is returned to in the cutting operation.

The circumference of the cutting blades for use in this invention are preferably continuous so as to minimize any sawing or milling out effect. This provides sipes which cut through the rubber rather than slots as might be otherwise provided. If slots are desired, however, saw tooth cutting blades may be substituted for those shown and the tire slotted.

The sipes produced by the cutting blades of the subject invention are shown in Fig. 6. Here it is seen that the sipes 30 are circular and are deepest at the shoulders of the tire. The center portion of the tread is uncut. This has been found to be preferable although the center portion may be cut by the apparatus of the subject invention.

An added advantage of this invention is the fact that the cuts are of equal depth on both sides of the tire tread. In ordinary siping operations, the cutting edge moves from one side of the tread to the other. This displaces the tread so that the cutting edge is deeper on one side than the other and the sipes are uneven. With my invention, there is no across-the-tread cutting motion to displace the tread and the cuts are of equal depth.

It is to be understood that, in accordance with the provisions of the patent statutes, variations and modifications of the invention herein shown and described may be made without departing from the spirit of the invention.

What I claim is:

1. A method of siping tires comprising the steps of supporting the tire and pressing a portion of the tire tread against a pair of opposed, disc-like cutting blades with removed, correlated circumferential portions and with circumferential cutting edges on the remaining portions, said blades being mounted for rotation substantially at right angles to the plane of tire beads and being directed toward the center of the tire, and continuously driving said tire and rotating said cutting blades so that said cutting blades engage the tire and prevent its rotation and so that when the cutting blades are not in engagement with the tire, the tire rapidly feeds itself forward until it is again engaged and held by the leading edge of the cutting blade.

2. A tire siping apparatus comprising a relatively high frame provided with a lower table, a pair of planar disc cutting blades with at least 60° of the circumferential portion removed to provide for advancement of the tire and with cutting edges in the remaining portion mounted for rotation about fixed axes substantially parallel to the plane of the tire beads, means for rotating the blades in opposite directions, a positioning arm pivoted on said lower table of the frame, a shaft mounted on the upper portion of said arm, a pair of complementary frusto-conical discs with outer cylindrical shoulder portions of smaller diameter rotatably mounted back-to-back on said shaft and being adapted to engage the beads of a tire positioned thereon and force the tire tread against said cutting blades, means on the lower portion of the positioning arm below the pivot point to move said arm about its pivot axis, a roller mounted on the frame below the cutting blades to prevent the tire being siped from scraping the frame, top and bottom spools mounted on the frame to engage the tread of the tire being siped and keep it against the cutting blades, and a spiked drum mounted on the table of the frame to engage the tread of the tire being siped and drive the tire past the cutting blades.

3. An apparatus for siping tires comprising tire positioning means adapted to guide and support a tire at the beads, circumferential tire guide and positioning means, circumferential tire drive means, a pair of disc-like cutting blades having a peripheral cutting edge with a portion comprising at least 60° of the circumference of the blade removed to provide a peripheral gap, said cutting blades being mounted for rotation in opposite directions about fixed axes so as to be in a plane substantially perpendicular to the plane of the tire beads and be directed substantially toward the center of the axis of rotation of the tire, and means for driving said cutting blades at correlated speeds whereby the blades simultaneously and intermittently disengage from the tread when their peripheral gaps are presented thereto and the tire tread is advanced by the circumferential tire drive means until it is engaged by the cutting blades.

4. The tire siping apparatus of claim 3 in which the central tire positioning means comprises a pair of complementary frusto-conical discs with the larger diameter near the center and with cylindrical shoulder portions of smaller diameter out from the center mounted back-to-back on a shaft which is in turn supported by a positioning arm adapted for in-and-out motion to place the tire tread against the disc-like cutting blades.

5. A tire siping apparatus comprising a frame, central tire positioning means, circumferential tire guide and positioning means, circumferential tire drive means, planar disc cutting means mounted for rotation about a fixed axis substantially parallel to the plane of the tire beads and directed substantially toward the center of the axis of rotation of the tire, and drive means for rotating the cutting means, said cutting means having a circumferential portion removed to form a continuous peripheral gap to provide for advancement of the tire and having cutting edges on the remaining portion.

6. A method of siping tires comprising the steps of supporting the tire and disposing a portion of the tire tread against planar disc cutting means wtih at least 60° of the circumferential portion removed to provide a continuous peripheral gap and with a circumferential cutting edge in the remaining portion, said means being mounted for rotation on an axis at right angles to the axis of rotation of the tire and being directed substantially toward the center of the axis of rotation of the tire and continuously driving said tire and rotating said cutting means to sipe the thread of the tire so that the tire advances only when the removed circumferential portion of the cutting means is presented to the tire and the cutting means in disengaged from the tire and so that the tire does not advance when the tire is engaged by the cutting means.

References Cited in the file of this patent

UNITED STATES PATENTS

| | | |
|---|---|---|
| 745,965 | Lyon | Dec. 1, 1903 |
| 1,628,817 | Wilson et al. | May 17, 1927 |
| 1,668,214 | Liebau | May 1, 1928 |
| 2,027,490 | Pendleton et al. | Jan. 14, 1936 |
| 2,105,316 | Fleming | Jan. 11, 1938 |
| 2,133,438 | Eger | Oct. 18, 1938 |
| 2,167,017 | Wikle | July 25, 1939 |
| 2,183,376 | Wikle | Dec. 12, 1939 |
| 2,308,467 | Kovacs | Jan. 12, 1943 |
| 2,339,558 | Hale | Jan. 18, 1944 |
| 2,567,149 | Errig et al. | Sept. 4, 1951 |
| 2,603,290 | Lindemann | July 15, 1952 |